June 23, 1942.  C. W. BAIRD  2,287,223
VIBRATING APPARATUS CONTROL
Filed Oct. 2, 1939  4 Sheets-Sheet 1

INVENTOR:
CLYDE W. BAIRD,
BY
Chas. M. Nixon,
ATT'Y.

INVENTOR:
CLYDE W. BAIRD,
BY
Chas. M. Nissen,
ATTY.

Patented June 23, 1942

2,287,223

UNITED STATES PATENT OFFICE 2,287,223

VIBRATING APPARATUS CONTROL

Clyde W. Baird, Columbus, Ohio, assignor, by mesne assignments, to The Traylor Vibrator Company, a corporation of Colorado Application October 2, 1939, Serial No. 297,622

34 Claims. (Cl. 172—240)

This invention relates to a system for controlling the delivery of current impulses to a vibratory electro-magnetic motor or conveyor at a frequency which is preferably determined by the natural period of vibration of the vibratory motor or conveyor, either with or without means for maintaining the amplitude of vibration thereof at any desired value which is prferably adjustable.

An object of the invention, therefore, is to provide the system having the above characteristics.

Another object of the invention is to provide a system for maintaining the amplitude of vibration of a vibratory member at any desired value which is preferably adjustable.

A further object of the invention is to provide a system for converting current of one frequency into current of a different frequency and simultaneously controlling the amount of current to maintain a vibrated element in vibration at any desired amplitude.

A further object of the invention is to provide a vibratory motor which will act to vibrate at its natural period of vibration though it derives energy from a source of current of a predetermined frequency which is different from its natural period of vibration while simultaneously maintaining the amplitude of vibration thereof substantially constant.

Other objects of the invention will appear hereinafter, the novel features and combinations being set forth in the appended claims.

Figures 1, 7:
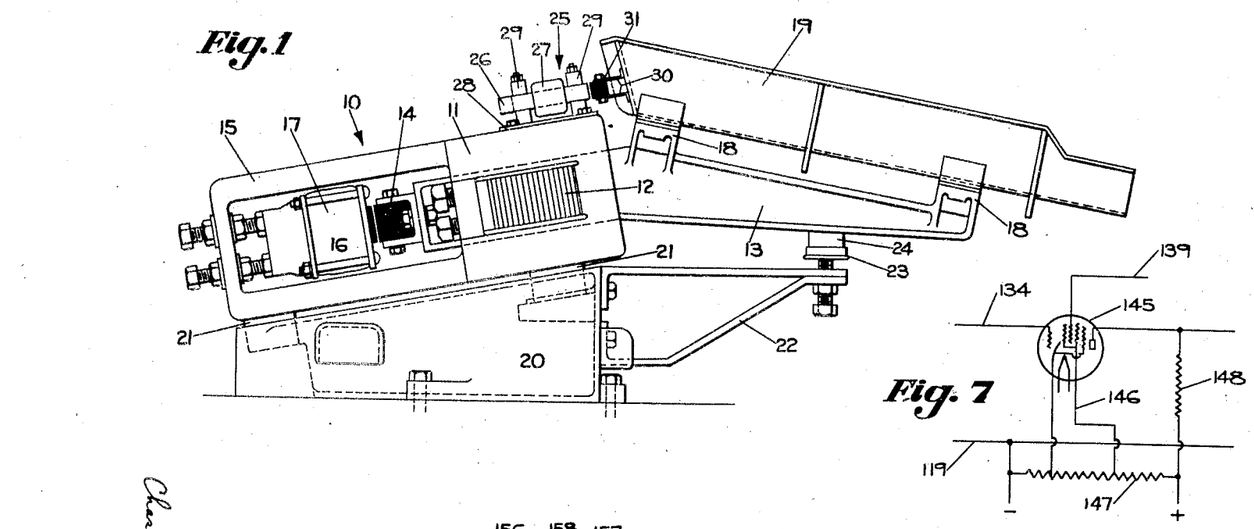
Fig. 1 is a side elevational view of a vibratory conveyor including as a part thereof a vibratory motor which forms a part of the system of my invention as illustrative of one of many different types of motors which may be employed as a part of my invention.
Fig. 7 is a detail of part of the system of Fig. 4.

Referring to Fig. 1 of the drawings, there is disclosed a vibratory conveyor, the general structure of which is disclosed in more complete detail in the patent of Earle V. Francis, No. 2,161,342, issued June 6, 1939, entitled Vibratory feeder, to which reference is made for a more complete disclosure thereof except for specific differences herein pointed out. Said vibratory conveyor may be briefly described as comprising a motor 10 formed by a main frame 11 to which is attached a plurality of spring bars 12, the ends of which are clamped in said main frame 11 and the centers of which are clamped to an armature shaft 13 to which is attached a vibratory armature 14.

Mounted on the main frame 11 is a bracket means 15 to which is adjustably attached a field structure 16 including a field winding 17. The armature shaft 13 is provided with front and rear brackets 18 upon which is supported a deck 19 adapted to receive material at its upper end, for example, from a feed hopper, and discharge it over its lower end. While the deck 19 is shown sloping downwardly this is not at all essential for it may be horizontal or it may even be inclined upwardly to a slight extent.

The main frame 11 is supported from a base 20 by a plurality of rubber cushion members 21. To aid in supporting the armature shaft 13, particularly to prevent distortion of the spring bars 12 by twisting, the base 20 carries a forward extending bracket 22 which supports an adjustable cup 23 carrying a rubber cushion 24 upon which the armature shaft 13 rests adjacent its forward portion.

Mounted in part upon the main frame 11 and in part upon the deck 19 or any other member rigidly attached to armature 14 is a magnetic pickup 25 or any similar device for generating or producing voltage variations proportional to the amplitude of vibration of the armature 14 with respect to the main frame 11.

The magnetic pickup 25 illustrated comprises a horse shoe magnet 26 which is permanently magnetized and which carries a coil 27 on each leg thereof, which coils 27 are either connected in series or in parallel as desired.

The magnet 26 is mounted on a base 28 by posts 29, 29. The base 28 is mounted on and preferably adjustable longitudinally with a respect to the main frame 11 of the motor 10.

Carried by a bracket 30 attached to the rear end of the deck 19 is an armature 31 preferably made of laminated steel which extends across the open end of the magnet 26 and vibrates with respect thereto whenever the armature 14 and those elements attached rigidly to it vibrate under the influence of undulating current flowing in the field winding 17. It is of course evident that any vibratory movement thus imparted to the armature 31 will generate a voltage or potential across the terminals of the coils 27 and this voltage is employed as hereinafter described in complete detail, for the double purpose of determining frequency of the impulses supplied to the field winding 17 and the amplitude of vibration of the armature 14 with respect to the main frame 11.

The adjustment of the base 28 with respect to the main frame 11 provides for an adjustment of the air gap between the magnet 26 and its associated armature 31.

The control system which I have provided is one which takes alternating current of any frequency, such as the usual commercially available 60 cycle alternating current, and converts it into undulating or pulsating current which has a frequency entirely independent of the predetermined frequencies available and which is preferably controlled so as to coincide with the natural period of vibration of the vibratory motor 10.

In addition, this control circuit maintains the amplitude of vibration of the vibratory motor 10 substantially constant regardless of the amount of useful work it is doing, and in the case where the motor is operating a conveyor or feeder, as illustrated in Fig. 1 of the drawings, the amplitude of vibration of the deck 19 is maintained substantially constant for all variations in load from no load to the maximum load placed thereon.

Figure 2:
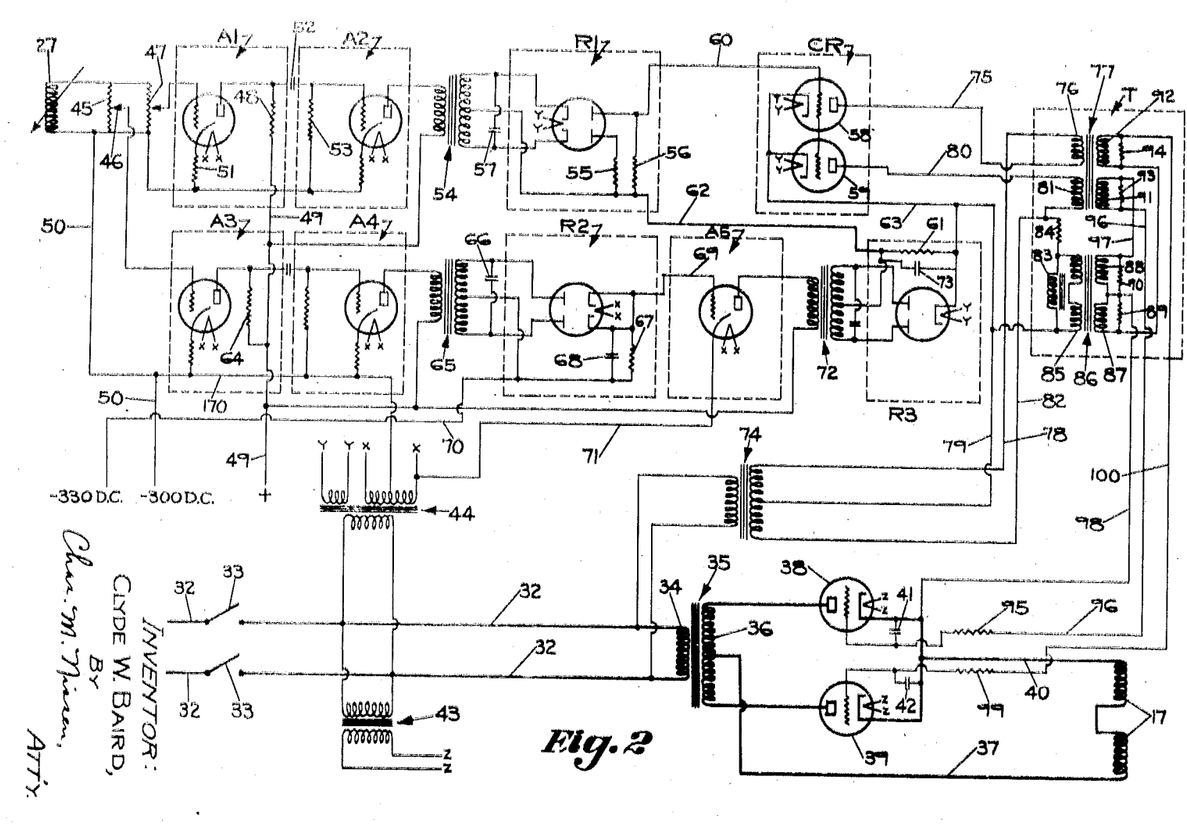
Fig. 2 is a wiring diagram of the preferred system comprising my invention.
Figure 3:
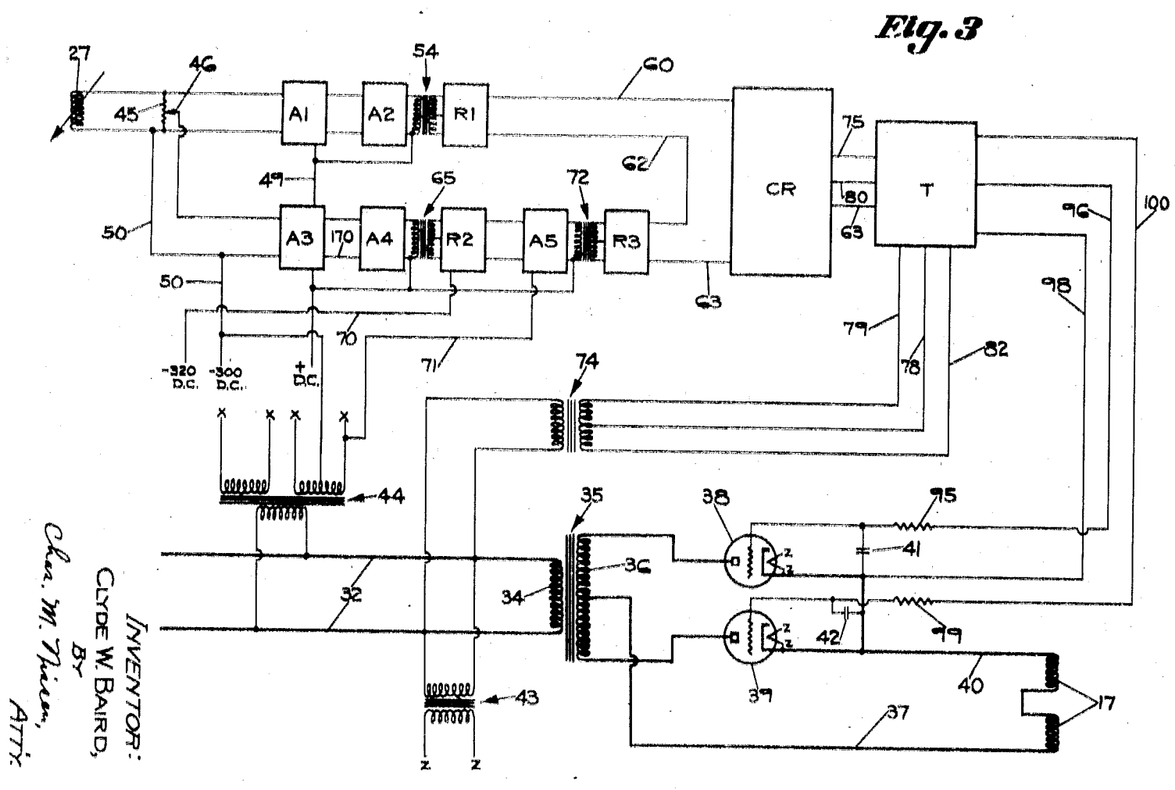
Fig. 3 is a simplified or block diagram of the system of Fig. 2.

Referring to Figs. 2 and 3 of the drawings which represent the same circuit in which in Fig. 3 the details of various units are not shown, there is seen a pair of main leads 32 from a source of alternating current, such as 60 cycle current which pass through a master switch 33 and are connected to the primary 34 of a transformer 35 provided with a split winding secondary 36, the center tap of which leads by a conductor 37 to the field winding 17 of the motor 10 which is illustrated as comprising two coils connected in series. The opposite ends of the secondary 36 lead to the plates of two electron discharge tubes 38 and 39, respectively, which are preferably of the three electrode gaseous discharge type. The cathodes of the tubes 38 and 39 are connected together by branch conductors which lead by way of conductor 40 to the other end of the field windings 17.

The electron discharge tubes 38 and 39 are preferably of the negative bias type; that is, they are normally conducting in the presence of adequate plate voltage and are rendered non-conducting only when sufficient negative bias is supplied to their grids.

I preferably also provide high frequency filter condensers 41 and 42 connected between the grids and cathodes of said tubes 38 and 39, respectively. It is evident that in the absence of any control whatever on the grids of the two tubes 38 and 39, these tubes will act as a full wave rectifier and deliver direct current to the field winding 17. This direct current may possibly be somewhat pulsating but the reactance of the coils 17 tends to smooth out the pulsations, and if this alone is inadequate, I provide a filtering condenser across the conductors 37 and 40. I generally find such a filtering condenser unnecessary.

I have illustrated the cathode heaters on the tubes 38 and 39, but in the interest of clearness, have not shown the complete heater circuits. These heaters derive current from a transformer 43 connected across the line 32, 32, the terminals z of the secondary of which are connected to the terminals z of the filaments of said tubes 38 and 39.

Also connected across the lines 32, 32 is a filament or heater transformer 44 having two secondaries, one of which has its terminals designated y, y which are connected to filaments similarly designated, the other of which has terminals designated x, x connected to similarly designated filament terminals.

By controlling the potentials on the grids of the tubes 38 and 39 and the phase relations of these potentials to the plate potentials on said tubes, it is possible to control said tubes 38 and 39 to deliver undulating or pulsating current to the field winding 17 of motor 10 of any desired frequency as determined by it, for example, or as controlled by the frequency of a controlling potential, as well as controlling the amount of current flowing to said winding 17, that is, the average amperage of the current flowing to said winding 17. The control circuit by which this is effected will now be described.

During vibration of the motor 10, a control voltage is generated in the coil 27 which of course has a frequency determined by the frequency of vibration of the armatures 14 and 31 which are rigidly connected together. Should armature 31 be independently operated, it would of course determine the frequency of the voltage generated in coil or coils 27. Furthermore, the value of this voltage or potential is controlled by the amplitude of vibration of the armatures 14 and 31 when connected together or the armature 31 when independently operated, as it may be, assuming the frequency of vibration thereof to be constant. This voltage generated in the coil 27 is presented to a potentiometer 45 having a variable tap 46, which potentiometer 45 provides a control voltage for the amplitude control branch or channel of the control circuit, which includes the lower branch or channel as best seen in Fig. 3 of the drawings.

As illustrated in Fig. 2, there is a second potentiometer 47 (having a variable tap) which is connected across the coil 27, but this potentiometer 47 is not necessary and is not illustrated in Fig. 3 of the drawings. If employed, the potentiometer 47 provides the voltage for the frequency control path or channel which is the upper path or channel best seen by reference to Fig. 3 of the drawings. In case the potentiometer 47 is omitted, the voltage across the outer terminals of potentiometer 45 is applied to the frequency control branch or channel. This frequency control voltage is supplied to the in-put circuit of an amplifier A1; that is, it is supplied across the grid and cathode thereof as clearly illustrated in Fig. 2 of the drawings. The continuous current plate circuit of amplifier A1 extends from the plate through resistor 48 and conductor 49 to the positive terminal of a source of direct current, such as a battery or filtered full wave rectifier, the circuit being completed from the —300 volt terminal of the battery by way of conductor 50 to the cathode through current limiting resistor 51. The fluctuating voltage out-put of the amplifier A1 is conducted through coupling condenser 52 to the terminals of resistor 53 across which is connected the in-put circuit of amplifier A2; that is, the grid and cathode of amplifier A2 are connected across resistor 53 and are therefore subject to the pulsating voltage present there-across as derived from amplifier A1. The out-put circuit of amplifier A2, including the cathode and anode which extends over an obvious circuit including the conductor 50 and the above mentioned source of direct current potential, leads to the primary of a coupling transformer 54 having a split secondary which feeds a double rectifier R1 having two obvious independent plate circuits, one of which extends through resistor 55 and the other through resistor 56.

It may be stated that the voltage drop across only one of the resistors 55 is employed for control purposes thereafter, and in the drawings it is the resistor 56. Resistor 55, however, is provided to complete the other plate circuit of the double rectifier R1 so that the secondary of transformer 54 will be in a balanced condition.

I also preferably but not necessarily provide a tuning condenser 57 across the terminals of the secondary of transformer 54 so as to at least approximately tune the circuit of the frequency of the alternating current which flows through it. It is of course obvious that the rectifier R1 rectifies the alternating current supplied to it and thereby provides a direct current potential across the resistor 56.

Furthermore, the value of this potential across resistor 56 is proportional to the voltage generated in the coil 27 but of course is considerably higher due to the amplification effected by amplifiers A1 and A2. This relatively high direct current voltage is employed together with another direct current voltage to control a phase shifting two-tube control rectifier CR; that is, the phase shifting control rectifier CR comprises two vacuum tubes 58 and 59, the grids and cathodes of which are connected in parallel.

The in-put circuit of these tubes 58 and 59 is from the two grids in series through resistor 56 by way of conductor 60, thence through another resistor 61 by way of conductor 62, which resistor 61 is in the out-put circuit of full wave rectifier R3, hereinafter described in complete detail, thence to the cathodes of said tubes 58 and 59 by way of conductor 63.

It may be stated that any potentials which appear on the resistors 56 and 61 are negative in character and add to reduce the conductivity of the two tubes 58 and 59 to effect a desired control as hereinafter explained in complete detail.

Attention is now directed to the lower or amplitude control branch or channel of the system which terminates ultimately in the resistor 61. A variable portion of the voltage across potentiometer 45, as determined by the position of variable tap 46, is delivered to the in-put circuit of an amplifier A3, the out-put circuit of which extends over an obvious path from the plate through resistor 64 to the positive terminal of the source of D. C. supply, the —300 volt terminal of said D. C. supply leading back to the cathode thereof through the usual cathode resistor. The alternating current out-put circuit leads to a second amplifier A4 over an obvious circuit, it being evident that the amplifiers A3 and A4 are substantially duplicates of amplifiers A1 and A2.

The out-put or plate circuit of amplifier A4 leads to the primary of coupling transformer 65, the secondary of which is similar to the secondary of the above described transformer 54 and has associated therewith a tuning condenser 66, said secondary feeding the cathodes of a full wave rectifier R2; rectifier R2 differs from rectifier R1 in that the two cathodes of rectifier R2 are connected together and both feed through a resistor 67 across which is preferably connected a filtering condenser 68.

Following the full wave rectifier R2 is an amplifier A5, the in-put circuit of which is connected in a particular manner to get a very particular type of control now to be described.

The in-put or grid-cathode circuit of the amplifier A5 extends from the grid by way of conductor 69 through resistor 67 along conductor 70 to terminal marked —330 volts of the direct current supply through the direct current supply to the —300 volt terminal thereof, then along conductor 50 to its junction with conductor 170 thence to the center tap of the right hand secondary winding of transformer 44 and then along conductor 71 to the cathode of said amplifier A5.

It is thus to be seen that the following potentials or voltages are impressed on the in-put of the amplifier A5, first is the voltage across resistor 67 which is of course a direct current voltage directly proportional to the voltage generated in coil 27 and which may be varied by varying the tap 46. It is of course evident that due to the amplification effected by amplifiers A3 and A4, this voltage across resistor 67 will be considerably higher than the voltage across the potentiometer 45 as selected by the tap 46.

In addition to this voltage across resistor 67 there is a voltage of minus approximately 30 volts as illustrated between the taps —330 and —300 of the source of D. C. supply plus a small A. C. voltage of the right hand secondary winding of transformer 44 which is included in this circuit. Of these three voltages it is evident that the illustrated 30 volts derived from the source of D. C. supply is of course negative in character and this places a negative bias of 30 volts in the illustration given on the grid of amplifier A5 which is sufficient alone to bias amplifier A5 considerably below cut-off. The voltage across resistor 67 is positive in character and thus opposes this fixed negative bias.

Furthermore, it is evident that the voltage across resistor 67 is variable and in addition is adjustable. It is adjustable by adjusting the tap 46 on potentiometer 45. It is variable depending upon the amplitude of vibration of the armature 31 of the magnetic pickup which of course determines the voltage generated in coil 27 in proportion of said amplitude of vibration.

Superposed upon these two direct current voltages is a very small alternating current voltage, for example of approximately three volts, supplied by the above mentioned winding of transformer 44.

It may be stated that the variable tap 46 is a manual control which determines the amplitude of vibration at which the vibratory motor 10 is automatically maintained in operation and the system is such that for any position of the tap 46 there is a predetermined amplitude of vibration of the motor 10 which it automatically reaches and maintains for any variations in operating conditions, such as variations in the load on the motor 10, or in illustration given on the deck 19.

The amplifier A5 has a normal condition of equilibrium in which conditions are as follows: The voltage across resistor 67 opposes the fixed bias on the grid to such an extent that there is a small current flow in the plate or out-put circuit of said amplifier A5 which, due to the above mentioned superposed alternating current voltage, is pulsating in character. If the amplitude of vibration of the vibratory motor tends to increase, this produces an increased voltage in the coil 27 which is manifest as an increased voltage across resistor 67. This increased voltage is positive in character and therefore causes amplifier A5 to amplify greatly the alternating current voltage derived from transformer 44 for relatively small changes of voltage in coil 27. As hereinafter described in full detail, this very great amplification of said alternating current voltage above the normal voltage delivered to transformer 72 during a condition of equilibrium of the amplifier A5 is employed to shift the phase relation between the grid voltages and plate voltages of the power tubes 38 and 39 to reduce their power supply to the winding 17 of the motor 10, thereby to reduce its amplitude of vibration to the predetermined value. On the other hand, if the amplitude of vibration of the armature 31 decreases below the predetermined value, a reverse condition is realized and there will be a corresponding decrease in the voltage across resistor 67 which will result in a large reduction of the current flow in the out-put or plate circuit of said amplifier A5 for a small change, with a consequent reduction of the voltage delivered to transformer 72 which, as hereinafter described, will increase the current flow to the winding 17 to effect a reestablishment of the condition of equilibrium.

The above mentioned out-put of the amplifier A5 is delivered by coupling transformer 72 to a full wave rectifier R3 which is generally similar to full wave rectifier R2, except that it is illustrated as having a single cathode. The in-put circuit thereof is preferably at least approximately tuned to the frequency of the current on the conductors 32, 32 and the out-put circuit feeds the resistor 61 which was previously mentioned, there being a filtering and voltage sustaining condenser 73 preferably connected across the resistor 61. It is of course obvious that the rectifier R3 rectifies current supplied to it from the amplifier A5 and thereby creates a direct current voltage across resistor 61.

As was previously pointed out, the in-put circuit of the control rectifier CR is subject to the control of the voltages across resistors 56 and 61. The voltage across resistor 56 is proportional to the voltage generated in coil 27 and is a series of half cycles having the same frequency as the frequency of the voltage generated in said coil 27. This voltage is employed to control the frequency at which the current impulses are delivered by the two gaseous discharge tubes 38 and 39 to the winding 17. The average value of the current which flows through the out-put circuits of the two tubes 58 and 59 of the rectifier CR is controlled very largely by the direct current voltage on the resistor 61 which is effective to control the phase relations between the grid and plate potentials of the gaseous tubes 38 and 39 in a manner now to be described.

The tubes 58 and 59 of control rectifier CR each act as a half-wave rectifier for a current derived from main lead conductors 32, 32 through transformer 74 having a split secondary winding. The plate or out-put circuit of tube 58 leads by way of conductor 75 through one primary winding 76 of a transformer 77 which forms a part of what I designate the phase shifting transformer T. This plate circuit also includes half of the secondary winding of transformer 74 by way of conductors 78 and 79, the latter of which is common with the two cathodes of tubes 58 and 59. The plate circuit of tube 59 extends over an obvious path by way of conductor 80 to primary winding 81 of transformer 77 and by way of conductor 82 to the other half of the secondary winding of transformer 74.

Connected across the terminals of both ends of the secondary winding of transformer 74 is a reactor 83 connected in series with a resistor 84. It is obvious that current flowing from this secondary of transformer 74 through the reactor 83 and resistor 84 will be out of phase with respect to the voltage across said transformer secondary. This current of course produces a voltage across reactor 83 which is out of phase with the voltage supplied to the windings 76 and 81, and in practice the values of reactor 83 and resistor 84 are preferably so adjusted that this voltage lags about 20 to 30 degrees.

Across the terminals of reactor 83 is connected a double primary winding 85 of a transformer 86 having secondary coils 87 and 88 across which are connected resistors 89 and 90, respectively, said coils 87 and 88 being so connected that the voltages across them and resistors 89 and 90 lag the voltages on the plates of tubes 38 and 39, respectively, by about 150 to 160 degrees.

The transformer 77 is also supplied with secondary coils 91 and 92 having connected across their terminals resistors 93 and 94, respectively.

As is well understood, the amount of current which will be passed by a gaseous discharge tube may be very effectively controlled by varying the phase relation of the grid-cathode voltage with respect to the cathode-anode voltage, and in a negative bias tube of the type here employed at 38, 39, there will be a maximum of current flow in case the two above mentioned voltages are in phase, for in this case there will be no negative bias at all on either tube 38 or 39 when the positive plate voltage is present, and consequently during each half cycle that each tube 38 and 39 is supplied with positive plate voltage there will be a maximum current flow.

The phase shifting transformer generally designated T cooperates with the phase shifting control rectifier CR to effect automatically the desired phase shifting of the above mentioned voltages on the tubes 38 and 39 to maintain the amplitude of vibration of the motor 10 constant while at the same time effecting an interruption of the current flow through winding 17 at a frequency determined by the frequency of vibration of the motor 10 and the armature 31 when they are connected together, as they preferably are.

To this end it is to be noted that the grid circuit of the tube 38 extends from the grid through a limiting resistor 95 then by way of conductor 96 across coil 91 and resistor 93 associated with it, then by way of conductor 97 to coil 88 and resistor 90 associated with it, then by a common conductor 98 to the cathode of said tube 38. As a consequence, the grid circuit of the tube 38 is subject to the voltages developed in coils 91 and 88 and across their associated resistors 93 and 90.

In a similar manner the grid circuit of tube 39 extends through limiting resistor 99, conductor 100 and derives potentials from windings 92 and 87 and their associated resistors 94 and 89, respectively.

It is evident that the value of the voltages generated in windings 87 and 88 and across the terminals of resistors 89 and 90 are substantially constant because they are not controlled in any manner but depend merely upon the voltage across lines 32 which is substantially constant.

On the other hand, the voltages across windings 91 and 92 and their associated resistors 93 and 94 are variable in value over quite a wide range. It is of course well known that when two out of phase voltages are added together the resultant is a voltage which has a phase relation variable with any variation in one or both of the added out of phase voltages. Consequently, by adding the voltage drop across resistor 93, for example, to the out of phase voltage drop across resistor 90, a phase shift in the resulting voltage will result with any variation in the value of the voltage drop across resistor 93, and since this voltage across resistor voltage 93 is variable in value as above set forth, the desired phase shift between the grid and plate voltages of the tube 38 will be effected.

It is of course evident that a similar action takes place with respect to tube 39 by virtue of variations in the value of the voltage across resistor 94 which is added to the out of phase voltage across resistor 89 and supplied to the grid of said tube 39.

It is thus manifest that with the control system which I have provided the variable tap 46 may be manually adjusted to provide any predetermined desired amplitude of vibration of the vibratory motor, and the vibratory motor itself determines the frequency at which impulses will be delivered to its windings 17 through the gaseous discharge tubes 38 and 39.

Furthermore, the system is entirely automatic in maintaining the amplitude of vibration of the motor 10 substantially constant. As above pointed out, the coil 27 is preferably energized by the magnetic pickup 25 associated with the motor 10 so that the frequency of the current delivered to the winding 17 of said motor 10 is determined by the natural period of vibration of said motor itself. This, however, is not necessary and the frequency controlled channel may be energized from an entirely separate source as, for example, a local source of alternating current in the form of a small generator, either of the rotating or vacuum tube type. The amplitude control branch or channel, however, must be associated with the motor, and in case the frequency controlled channel is separately excited, the amplitude controlled channel alone would be controlled from the magnetic pickup 25 which would then act solely to maintain a constant amplitude of vibration. It would not affect the frequency at which the motor operated.

It may be pointed out that all of the tubes, either rectifier or amplifier, employed are preferably of the common vacuum tube type employed in radios, except for the tubes 38 and 39 which are preferably of the gaseous discharge type.

Figure 4:
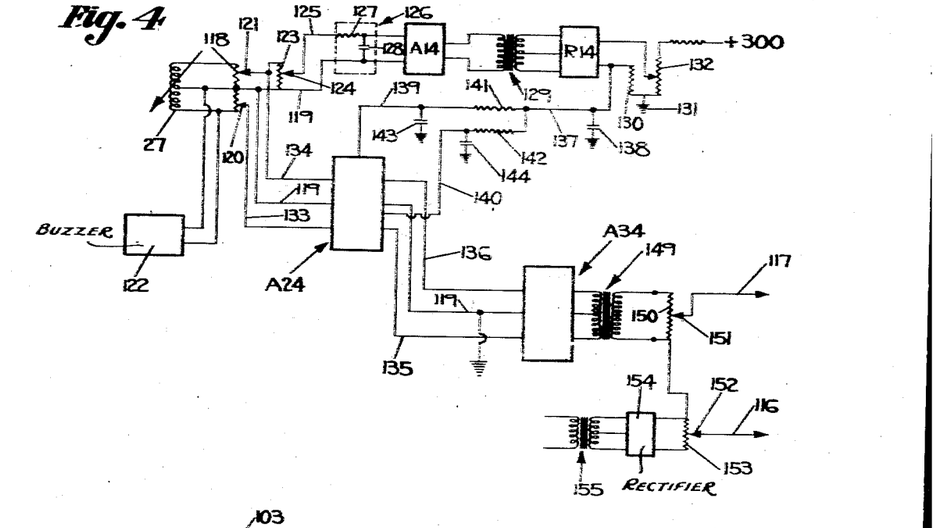
Fig. 4 shows a modified form of control system.
Figure 5:
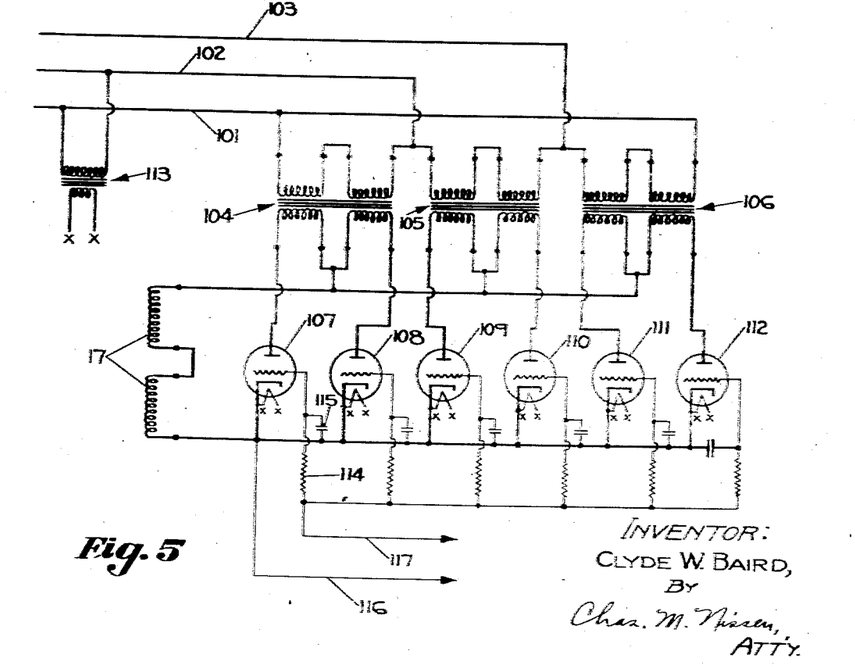
Fig. 5 shows a modified power circuit which may be controlled by the system of Fig. 4.

Attention is now directed to Figs. 4 and 5 of the drawings, the former of which is a simplified or block diagram of the control system and the latter of which is a diagram of the power circuit which is operated from a 3-phase source of alternating current supply. The block diagram of Fig. 4 of course does not illustrate the sources of filament or plate current supply. This block circuit diagram, however, will be understood by those familiar with vacuum tube circuits.

Referring first to Fig. 5 of the drawings, it will be seen that a 3-phase source of supply from power mains 101, 102 and 103 energizes the primaries of three transformers 104, 105 and 106, said primaries being connected in delta, the secondaries of which are connected in double star by virtue of two secondary windings on each transformer, the ends of each of which lead to the plates of a pair of gaseous discharge tubes, there being six such tubes seen at 107, 108, 109, 110, 111 and 112.

The center taps of the secondaries of transformers 104, 105 and 106 are connected together and to one terminal of the field winding 17 of the motor 10. The other terminal of the winding 17 is connected to each cathode of the tubes 107 to 112, inclusive, in parallel.

The heater filaments of the tubes 107 to 112, inclusive, are heated from a transformer 113 connected across a pair of the mains 101, 102. The grids of the tubes 107–112 are connected together through individual current limiting resistors, that for tube 107 being seen at 114. Each grid is also provided with a protecting condenser, that for tube 107 being seen at 115. Control conductors 116 and 117 are provided for all of the tubes 107–112 in parallel and lead to the control circuit of Fig. 4 or of Fig. 6, the former of which is now to be described.

Said control circuit of Fig. 4 comprises the previously mentioned pickup coil 27 which in this instance is provided with a center tap and leads to a potentiometer 118, the center of which is connected to a conductor 119 and with which is associated a pair of variable taps 120 and 121 which are preferably mechanically connected together to move in unison toward and from the center thereof at which conductor 119 is connected.

Connected across a half of potentiometer 118 is a buzzer starter 122, which is a simple push button controlled buzzer operable to impose an alternating voltage on potentiometer 118 to effect starting of the vibratory motor 10 as hereinafter explained more completely.

Connected between the variable tap 121 and the conductor 119 is a second potentiometer 123 having a variable tap 124 from which leads a conductor 125. Connected across conductors 119 and 125 is a phase shifting mechanism 126 which comprises a resistor 127 and a condenser 128 connected in series across said conductors.

Connected across the terminals of condenser 128 is an amplifier A14 which of course amplifies the voltage which appears across the condenser 128 which, due to the phase shifting mechanism 126, is out of phase with the voltage across potentiometer 123.

The out-put of amplifier A14 is stepped up by transformer 129 and fed to a full-wave rectifier R14 in the out-put circuit of which is a load resistor 130 which is connected to ground at 131 and a variable voltage delay potentiometer 132 connected to ground 131 at one end and at the other end through a limiting resistor to the positive terminal of the source of potential for the various amplifiers.

The variable tap of potentiometer 132 is adjusted to have a positive voltage on the cathode of rectifier R14 until a predetermined desired voltage is delivered from coil 27 through amplifier A14, transformer 129, etc., which is sufficient to overcome this positive cathode voltage only under which conditions will there be any flow of current in the load resistor 130. For example, a positive voltage of approximately 20 volts may be delivered to the cathode of rectifier R14 and this voltage must be overcome by the in-put voltage thereto before any current will flow in load resistor 130. This flow of current in load resistor 130 of course produces a potential there across which is used to control the power delivered to the motor 10 through the gaseous discharge tubes 107 to 112, inclusive, to maintain automatically the amplitude of vibration thereof at any fixed value as determined by the simultaneously adjustment of the variable taps 120, 121 in a manner hereinafter described.

The variable taps 120, 121 are connected to a pair of conductors 133 and 134, respectively, which lead to a balanced amplifier A24 of the push-pull type, each part of which includes a 5-grid vacuum tube connected as illustrated in Fig. 7 of the drawings, it being understood that in said Fig. 7 only one half of the push-pull stage is illustrated. Before describing this detailed showing of Fig. 7, it may be pointed out that the in-put circuit to one tube thereof is by way of conductors 119 and 134, and the out-put is by way of conductors 119 and 136. The in-put to the other tube is provided by conductors 119 and 133 and the out-put by conductors 119 and 135.

In addition, there is a further grid control for each of the tubes thereof which is under the control of resistor 130; that is, the voltage across resistor 130 is delivered to these grids, first by way of common conductor 137 which is provided with a filter 138 to ground and then by way of branch conductors 139 and 140, respectively, which lead through limiting resistors 141 and 142 and are grounded through filtering condensers 143 and 144, respectively.

Referring to Fig. 7 of the drawings, it will be seen that one of the tubes 145 of the amplifier A24 is provided with 5 grids, two of which are in fact connected together to form a screen grid which is connected to a conductor 146 and supplied with a biasing voltage, such as approximately 90 volts, from a potentiometer 147 connected across the source of direct current plate supply.

Another grid is directly connected to the in-put conductor 134. Still another grid is directly connected to the cathode. The last grid is connected to the conductor 139 and impresses a control on the tube 145 under the influence of the current flow in potentiometer 130.

It may additionally be pointed out that the out-put or plate circuit of the tube 145 includes load resistor 148. The tubes of amplifier A24 operate in the following manner: So long as the voltage generated in coil 27 and subsequently amplified and delivered to rectifier R14 is insufficient to overcome the delay voltage on potentiometer 132, the amplifier A24 will operate under the influence of the grids connected to conductors 133 and 134 to amplify the voltage generated in coil 27 and impressed on the potentiometer 118 in substantially direct proportion to the voltage. However, just as soon as the voltage in-put of rectifier R14 is sufficient to overcome the delay voltage of potentiometer 132 thereby producing a current flow in load resistor 130, the grids associated with conductors 139 and 140 become effective and they are so connected as to provide a negative bias on their associated tubes which reduces the out-put of A24 with an increase in the voltage generated in coil 27. In other words, amplifier A24 is what is known as a suppressor amplifier.

The out-put of the amplifier A24 is delivered to power amplifier A34 which is simply a push-pull amplifier, the out-put of which is delivered to the in-put circuit of transformer 149, the out-put of which is connected across potentiometer 150 with which is associated a variable tap 151 connected to conductor 117 previously described. (Fig. 5.)

The conductor 116 previously described is connected to a variable tap 152 associated with a potentiometer 153 which is connected across the out-put circuit of a full-wave rectifier 154 which may be energized through transformer 155 from any available source of alternating current.

It is manifest that all of the in-put or grid circuits of the power tubes 107 to 112, inclusive, are subject to a fixed negative bias provided by the potentiometer 153 which is adjustable in value. Furthermore, this negative bias is in excess in value (in the negative sense) of the cut-off bias of the tubes 107-112; that is, gaseous discharge tubes 107 to 112, inclusive, are the negative bias type and the bias provided by potentiometer 153 is so adjusted by tap 152 that this bias alone would be sufficient to prevent any flow of current through said tubes 107 to 112, inclusive. However, in addition, the grid or in-put circuits of said tubes 107 to 112, inclusive, are subject to the alternating current voltage across potentiometer 150 as determined by the position of variable tap 151 which alternating current voltage has a frequency as determined by the frequency of the voltage generated in coil 27, it being understood that the voltage generated in coil 27 is in accordance with the previous description thereof in connection with Figs. 1, 2 and 3.

The alternating current voltage of potentiometer 150 is adjusted to be sufficient as fed to conductors 116 and 117 to overcome periodically the cut-off bias of the tubes 107-112, inclusive, at a frequency determined by the frequency thereof so as to render said tubes 107-112 periodically conducting so that impulses or undulating current flows to the winding 17 having a frequency as determined by the frequency generated in coil 27.

Furthermore, the voltage which appears across potentiometer 150 will tend to increase under the tendency of the motor 10 to increase its amplitude of vibration until a balanced condition is realized by the above mentioned flow of current through the load resistor 130 which provides the suppressor action through amplifier A24 whereupon a stable condition will be realized and the amplitude of vibration of the motor 10 will be maintained constant. Any change from this stable condition, either of an increased or decreased amplitude will be automatically compensated for by the suppressor amplifier A24 under the influence of the potentiometer 130.

It may be pointed out that since the potentiometer 153 provides a negative bias to cut off the tubes 107—112, the apparatus is not self-starting as is the apparatus with the system of Figs. 2 and 3 and so the buzzer 122 is employed to inject a starting impulse into the system to effect starting of the motor 10.

The amplitude of vibration of motor 10 can be manually adjusted by adjustment of the variable taps 120 and 121 on the potentiometer 118, and the system is automatic in its operation to maintain said amplitude at any fixed condition.

It may be stated that the phase shifting mechanism 126 is not entirely essential to this system, but I have found from experiment that it tends to make the vibration at low amplitudes much more steady than when it is omitted.

Furthermore, while I have shown amplifiers A24 and A34 as of the push-pull type, this is not essential as they may be straight single tube amplifiers, though of course the push-pull arrangement makes for greater voltage handling capacity and if straight amplifiers were used, another stage of amplification might be required under certain conditions.

While I have illustrated in Fig. 5 of the drawings that power is derived from a 3-phase source and in effect provides a 6-phase out-put which is rectified and chopped up at a frequency determined by the frequency generated in coil 27, it is to be understood that a single phase power circuit may be provided by the simple expedient of employing only a single transformer such as transformer 104 with two tubes associated therewith, such as tubes 107 and 108.

Figure 6:
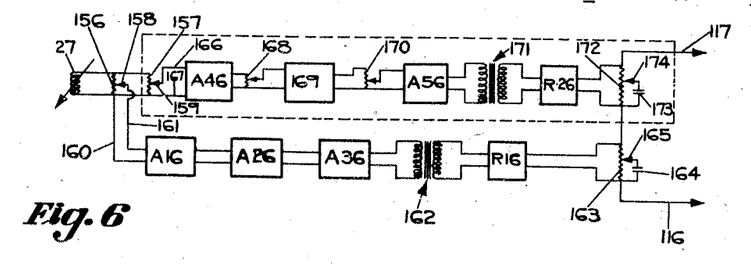
Fig. 6 is a further modified form of control circuit which may control the power circuit of Fig. 5.

Attention is now directed particularly to Fig. 6 of the drawings which shows another form of control system which may be employed to control the power circuit, for example as illustrated in Fig. 5 of the drawings. In other words, the control circuit of Fig. 6 may be substituted for the control circuit of Fig. 4.

With this control circuit the pickup coil 27 has two potentiometers 157 and 156 connected across its terminals with which are associated variable taps 158 and 159, respectively. The voltage across potentiometer 156 as taken off by tap 158 is fed to an amplitude control branch or channel by conductors 160 and 161. This amplitudes control channel includes a pair of amplifiers A16 and A26 connected in tandem, the latter of which feeds a power amplifier A36 in the out-put circuit of which is connected the primary of a transformer 162.

To the secondary of transformer 162 is connected a rectifier R16 which of course rectifies the current supplied to it and delivers it to the potentiometer 163 which has a sustaining condenser 164 connected across a variable portion thereof by variable tap 165. That is, condenser 164 sustains the voltage on potentiometer 163 after current ceases to be delivered thereto from rectifier R16 and by varying the position of tap 165 this period may be varied. The voltage across potentiometer 163 is of course direct current voltage, and it is used to control the amplitude of vibration of the vibratory motor 10 and acts to maintain it automatically at a predetermined value in accordance with the setting of tap 158 associated with potentiometer 156 which of course provides a variation in the amplitude of vibration of said motor 10. It is of course evident that the voltage generated across potentiometer 163 depends upon the amplitude of vibration of the armature 31 or in other words, upon the voltage generated in coil 27 or any given position of tap 158. Any increase in this voltage from a stable condition which will be realized as soon after the apparatus is placed in operation will cause an increase in the value of this voltage across potentiometer 163 which, being negative in character, will shut off conduction through the gaseous discharge tubes 107 to 112, inclusive, sooner with respect to each stroke of the armature 14 toward the stator of the motor 10. A decrease produces a reverse result.

It may be pointed out that the rectifier R16 is a half-wave rectifier and consequently the out-put is a pulsating direct current thereby producing a pulsating direct current voltage in potentiometer 163, and this direct current voltage is generated by the power stroke of the motor 10; that is, the stroke during which the armature 14 is pulled toward the stator or field structure 16 during which time the current is flowing through the electron discharge tubes 107 to 112, inclusive, and by cutting off this flow of current at a variable time it is of course manifest that the total current flow to the motor may be varied, and since this is automatic, the amplitude of vibration will be maintained substantially constant, it being understood that a reverse condition, that is, a reduction in the voltage across potentiometer 163, from the condition of equilibrium will produce a reverse result.

A frequency control channel of the control system of Fig. 6 derives a variable amount of voltage from potentiometer 157 by virtue of adjustable tap 159, and conductors 166 and 167 lead from said potentiometer 157 to amplifier A46 in the out-put of which is connected a potentiometer 168 which is provided with a variable tap and which feeds the in-put circuit of a relaxation type oscillator 169 which, as is well understood by those familiar with vacuum tubes, is a 3-electrode gaseous discharge tube connected so as to oscillate at a relatively low frequency. The relaxation oscillator tends to oscillate at a frequency which may be determined by adjusting the condenser associated with it, and it will oscillate in the absence of any in-put control. This assures an oscillatory current being delivered to the motor 10 which will prevent its stopping. The relaxation oscillator is also easily controlled as to frequency by feeding any predetermined frequency to its in-put or grid circuit. The frequency of the oscillator will readily follow in step with the in-put frequency. Consequently, in my system the out-put frequency from the relaxation oscillator 169 is maintained in step with the frequency generated in coil 27 which of course is the natural period of vibration of the motor 10, but in case no voltage is generated in coil 27 the relaxation oscillator will generate an alternating current voltage to start the operation of the machine automatically.

The out-put circuit of relaxation oscillator 169 feeds a potentiometer 170 provided with a variable tap which in turn feeds a power amplifier A56, the out-put circuit of which feeds the primary of transformer 171, the secondary of which feeds a half-wave rectifier R26, the out-put circuit of which of course delivers a pulsating direct current to potentiometer 172 across which is connected a condenser 173 by a variable tap 174. The condenser 173 may be adjusted to vary the wave shape of the voltage generated across potentiometer 172 by adjusting tap 174. This adjustment also varies the time constant of the potentiometer 172 causing the negative bias voltage developed thereon to vary in amplitude and in the time it is held on the grids of the gaseous discharge tubes 107 to 112, inclusive, with each impulse of the pickup coil 27.

It may be pointed out that potentiometer 157 controls the in-put from coil 27 to the frequency control channel. The potentiometer 168 controls the amount of synchronizing voltage applied to the oscillator 169, and potentiometer 170 controls the total output to be delivered to potentiometer 172.

The two potentiometers 163 and 172 are connected in series and the total voltage derived from them is delivered to the two conductors 116 and 117, which as above described in connection with Fig. 5, control the grid or in-put circuits of the gaseous discharge tubes 107 to 112, inclusive.

As was previously mentioned, the half-wave impulses on potentiometer 163 appear on the power stroke or on the stroke of the armature 14 toward the field structure 16. The half-wave impulses on potentiometer 172 are developed on the opposite stroke or, in other words, on the movement of the armature 14 away from the field structure 16.

Furthermore, the value of the voltage which appears on potentiometer 172 is much higher though of the same sign as the voltage generated across potentiometer 163, and it is such that it maintains a very high negative bias on the grids of the gaseous discharge tubes 107 to 112, inclusive, to maintain them completely cut off during the stroke or movement of the armature 14 away from the stator or field structure 16. This of course insures the delivery of pulsating or undulating current through the electron discharge tubes 107 to 112, inclusive, to the winding 17 of the motor 10 at a frequency determined by the frequency of the voltage generated in coil 27 which, after vibration is once started by oscillator 169 will be the natural period of vibration of motor 10 when pickup coil 27 is associated therewith in the preferred form as illustrated in Fig. 1 of the drawings. The current flow is only effected during the movement of the armature 14 toward the field structure 16 and the proportion of this movement during which current actually flows is automatically adjusted for each setting of the tap 158 so as to maintain the amplitude of vibration constant for any predetermined setting of said tap 158. Of course, by adjusting the position of tap 158, the equilibrium position or, in other words, the amplitude of vibration of the motor 10 may be adjusted from the maximum for which the machine is designed to substantially zero.

It is evident from the above description that in each of the systems which I have provided, particularly in the preferred arrangement alternating current, either of single phase or 3-phase or any other number of phases, is converted into pulsating current by controlling the grids of power tubes which are preferably of the gaseous discharge type, though it is to be understood that any other type may be employed in which the firing of the tubes may be controlled by a grid or similar control element.

Furthermore, in each system a magnetic pickup is associated with the motor or feeder to generate a controlling voltage which serves a double purpose. The first purpose is to control the frequency at which the power tubes are allowed to discharge thereby feeding impulses to the machine at a frequency corresponding to the natural period of vibration of the motor 10.

In the second place, this generated voltage is proportional in value to the amplitude of vibration and this characteristic is employed to maintain the amplitude constant at any value which may be adjusted by manually adjustable means. This is particularly important in connection with vibratory feeders or conveyors which are subject to variable loads because it has been found that when such a machine is operated at its natural period of vibration, the amplitude varies appreciably with the load unless some automatic correction is effective. For example, if during full load the amplitude is maintained at a desired value to convey the necessary amount of material the current will be so high that if the load is appreciably reduced this current will cause an undesirable large amplitude of vibration which will be destructive to the machine, unless some control is provided, as I have.

In my system the desirable characteristics, the principal one of which is maximum economy, are realized by operating the motor at its natural period of vibration while the undesirable normal characteristic of such operation, namely of wide variation in amplitude with load variations, is completely overcome.

Furthermore, an important characteristic of my system is that there is no necessary relation between the frequency of the alternating current available and the frequency of vibration of the motor 10 because the current derived from the primary source, as through conductors 32, 32 or conductors 101, 102 and 103 may be of any frequency which may even vary to any extent whatever without in any way affecting the operation of the machine when controlled by my system.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In apparatus of the class described, the combination with a vibratory motor including a vibrated member for doing work on material, of electromagnetic means for vibrating said member, electrical means operable by vibration of said member to provide a fluctuating voltage proportional to the amplitude of vibration thereof, a power circuit for said electromagnetic means including a gaseous electron discharge tube having an element for controlling the conductivity thereof, and means operable in response to the voltage provided by said electrical means for controlling said conductivity controlling element for determining both the frequency and amperage of the current delivered to said electromagnetic means.

2. In vibratory apparatus, the combination with a vibratory motor having a natural period of vibration and having a vibrated member adapted to do work on material, of a power circuit for feeding current to said motor comprising controllable gaseous electronic means, means for controlling the frequency of periods of conductivity of said electronic means to coincide with said natural period of vibration and to control the value of current flow therethrough including electrical means operable to generate a variable undulating voltage in response to vibratory movement of said motor and operable in response to variations in the amplitude of vibration thereof to adjust the phase relation of the control and plate voltages of said electronic means to maintain the amplitude of vibration of said motor substantially constant.

3. In vibratory apparatus, the combination with a vibratory motor including a vibratory member adapted to do work on material, of a power circuit therefor including a source of alternating current and a gaseous electronic valve having a conductivity controlling element, and means including a magnetic pickup device vibrated by said motor for controlling the conductivity controlling element to determine the frequency of periods of conductivity of said electronic valve independently of the frequency of said source of current.

4. In vibratory apparatus, the combination with a vibratory motor, of a power circuit therefore including an electronic valve having a conductivity controlling element, means for controlling the value of the current flow through said electronic valve by controlling the phase relation of the controlling element and anode voltages, said means including means to supply the resultant of two out of phase voltages to said controlling element, one of which voltages is substantially constant and the other a variable and which is generated by the vibration of said motor and whose value is controlled by the amplitude of vibration thereof.

5. In vibratory electromagnetic apparatus, the combination with a vibratory electromagnetic motor having a natural period of vibration, of a circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits including electronic tubes, connections whereby both channels derive voltage from said pickup, one channel comprising a frequency control channel and including means to produce an undulating voltage corresponding in frequency to the natural period of vibration of said motor, the other an amplitude control channel and including means to produce a voltage determined by the amplitude of vibration of said motor, means for adjusting manually the voltage produced by said amplitude control channel to adjust the amplitude of vibration of said motor, and means operable by the combined influence of the voltages derived from both said channels on the conductivity control means of said electronic valve means for delivering current in impulses to said motor at its natural period of vibration and at a value to maintain its amplitude substantially constant at any selected value.

6. In vibratory electromagnetic apparatus, the combination with a vibratory electromagnetic motor having a natural period of vibration, of a circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits including electronic tubes, connections whereby both channels derive voltage from said pickup, one channel comprising a frequency control channel and including means to produce an undulating voltage corresponding in frequency to the natural period of vibration of said motor, the other an amplitude control channel and including means to produce a voltage determined by the amplitude of vibration of said motor, and means operable by the combined influence of the voltages derived from both said channels on the conductivity control means of said electronic valve means for delivering current impulses to said motor at its natural period of vibration and at a value to maintain its amplitude substantially constant at any selected value.

7. In vibratory electromagnetic apparatus, the combination with a vibratory electromagnetic motor having a natural period of vibration, of a circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits including electronic tubes, connections whereby both channels derive voltage from said pickup, one channel comprising a frequency control channel and including means to produce an undulating voltage corresponding in frequency to the natural period of vibration of said motor, the other an amplitude control channel including means to produce a voltage determined by the amplitude of vibration of said motor, and means operable by the combined influence of the voltages derived from both said channels on the conductivity control means of said electronic valve means for delivering current in impulses to said motor at its natural period of vibration and at a value to maintain its amplitude of vibration substantially constant at any selected value, said means comprising a two tube rectifier having in its in-put circuit voltage devices connected in series, one in said frequency control channel out-put, the other in said amplitude control channel, means deriving an out-put voltage from said rectifier and adding it to a substantially constant out of phase voltage, means whereby the resultant of said two added voltages are applied to the conductivity control means of said electronic valve means, and means in said amplitude control channel for producing a very rapid change in output voltage when its input voltage increases above a predetermined value.

8. In apparatus of the class described, the combination with a vibratory electromagnetic motor, of electron discharge means for supplying current to said motor from a source of alternating current, means for controlling the electron discharge means to control the frequency and amperage of the current delivered to said motor comprising means for adjusting the phase relation of the grid and plate potentials on said electron discharge means in response to amplitude variations of said motor, and means controlling the frequency of said grid potential independently of the frequency of the source of alternating current.

9. In apparatus of the class described, the combination with a vibratory electromagnetic motor, of electron discharge means for converting current of one frequency into current of a different frequency and supplying it to said motor, said electron discharge means including control means to adjust the amperage and frequency of current flowing therethrough, means controlled by said motor for generating a frequency and amplitude control voltage, means for deriving a direct current controlling potential therefrom to be applied to said electron discharge control means, and means comprising a condenser for sustaining said direct current controlling potential.

10. In apparatus of the class described, the combination with a vibratory electromagnetic motor, of electron discharge means for converting current of one frequency into current of a different frequency and supplying it to said motor, said electron discharge means including control means to adjust the amperage and frequency of current flowing therethrough, means controlled by said motor for generating a frequency and amplitude control voltage, means for deriving a direct current controlling potential therefrom to be applied to said electron discharge control means, and means for sustaining said direct current controlling potential.

11. In apparatus of the class described, the combination with a vibratory electromagnetic motor, of electron discharge valve means having a control grid controllable to convert current of one frequency delivered to said electron discharge means to current of another frequency, a voltage generator operated by said motor to generate a voltage of the frequency of vibration of said motor, means including a self-sustaining controllable frequency oscillating generator for generating a voltage to control the frequency of the current delivered to said motor, connections between said oscillating generator and said control grid, and means interconnecting said voltage generator to said oscillating generator so that the former when once started controls the frequency of the latter, the latter operating independently when the former stops.

12. In apparatus of the class described, the combination with a vibratory electromagnetic motor, of a gaseous electron discharge valve means having a control grid controllable to convert current of one frequency delivered to said electron discharge means to current of another frequency, a voltage generator operated by said motor to generate a voltage of the frequency of vibration of said motor having a magnitude proportional to its magnitude of vibration, means operable in response to the output voltage of said voltage generator to control the frequency and amperage of the output current of said valve means, said means including a suppressor valve, and means controlled by the magnitude of said output voltage and including a fixed rectifier having a delay voltage means which must be overcome thereby to control said suppressor valve to reduce the output current of said valve means and operable to maintain the amplitude of vibration of said motor substantially constant under the control of said voltage generator.

13. In apparatus of the class described, the combination with a vibratory electromagnetic motor, of a gaseous electron discharge valve means having a control grid controllable to convert current of one frequency delivered to said electron discharge means to current of another frequency, a voltage generator operated by said motor to generate a voltage of the frequency of vibration of said motor having a magnitude proportional to its amplitude of vibration, means operable in response to the voltage output of said voltage generator to control the frequency and amperage of the output current of said valve means, said means including a suppressor valve having control means which reduces the amperage of said valve means as the voltage output of said voltage generator increases above a selected value thereby to maintain the amplitude of vibration of said motor substantially constant under the control of said voltage generator.

14. Vibratory control apparatus comprising a vibratory electro-magnetic motor, electro-magnetic means for producing an alternating voltage which is variable in value with variations in the amplitude of vibration of said motor from a predetermined desired amplitude, means converting said alternating voltage into a proportional direct current voltage, and mechanism operative in response to variations in the voltage of said direct current voltage to adjust automatically the current flow to said electro-magnetic motor thereby to maintain the amplitude of vibration of said electro-magnetic motor substantially constant at said predetermined desired value.

15. In apparatus of the class described, the combination with a vibratory electric motor comprising a vibrated member adapted to support and do work on a variable load of material, said motor having a natural period of vibration, of electrical power circuit means for operating and controlling said motor to deliver undulating current thereto form a source of alternating current at a frequency determined by the natural period of vibration of said motor and independently of the frequency of said source of alternating current, said power circuit means including gaseous electron discharge tube means having control element means for controlling the current flow therethrough, control circuit means comprising an electrical pick up operated by vibration of said motor to produce an undulating voltage having a magnitude proportional to the amplitude of vibration of said motor and having an undulatory frequency determined by the vibratory period of said motor, and electrical means responsive to the frequency of said undulating voltage to control the control element means of said tube means to make the current flow therethrough have an undulatory frequency in synchronism with the natural period of vibration of said motor, said electrical means being responsive to variations in the magnitude of said undulatory voltage to maintain the amplitude of vibration of the vibrated member of said motor substantially constant.

16. In apparatus of the class described, the combination with a vibratory electric motor comprising a vibrated member adapted to do work on material, said motor having a natural period of vibration, of electrical power circuit means for operating and controlling said motor to deliver undulating current thereto from a source of alternating current at a frequency determined by the natural period of vibration of said motor and independently of the frequency of said source of alternating current, said power circuit means including gaseous electron discharge tube means having control element means for controlling the current flow therethrough, control circuit means comprising an electrical pick up operated by vibration of said motor to produce an undulating voltage having a magnitude proportional to the amplitude of vibration of said motor and having an undulatory frequency determined by the vibratory period of said motor, and electrical means responsive to the frequency of said undulating voltage to control the control element means of said tube means to make the current flow therethrough have an undulatory frequency in synchronism with the natural period of vibration of said motor, said electrical means being responsive to variations in the magnitude of said undulatory voltage to maintain the amplitude of vibration of the vibrated member of said motor substantially constant.

17. In apparatus of the class described, the combination with a vibratory electric motor comprising a vibrated member adapted to support and do work on a variable load of material, said motor having a natural period of vibration, of electrical power circuit means for operating and controlling said motor to deliver undulating current thereto from a source of alternating current at a frequency determined by the natural period of vibration of said motor and independently of the frequency of said source of alternating current, said power circuit means including electron discharge tube means having control element means for controlling the current flow therethrough, control circuit means comprising an electrical pick up operated by vibration of said motor to produce an undulating voltage having a magnitude proportional to the amplitude of vibration of said motor and having an undulatory frequency determined by the vibratory period of said motor, and electrical means responsive to the frequency of said undulating voltage to control the control element means of said tube means to make the current flow therethrough have an undulatory frequency in synchronism with the natural period of vibration of said motor, said electrical means being responsive to variations in the magnitude of said undulatory voltage to maintain the amplitude of vibration of the vibrated member of said motor substantially constant.

18. In apparatus of the class described, the combination with a vibratory electric motor comprising a vibrated member adapted to do work on material, said motor having a natural period of vibration, of electrical power circuit means for operating and controlling said motor to deliver undulating current thereto from a source of alternating current at a frequency determined by the natural period of vibration of said motor and independently of the frequency of said source of alternating current, said power circuit means including electron discharge tube means having control element means for controlling the current flow therethrough, control circuit means comprising an electrical pick up operated by vibration of said motor to produce an undulating voltage having a magnitude proportional to the amplitude of vibration of said motor and having an undulatory frequency determined by the vibratory period of said motor, and electrical means responsive to the frequency of said undulating voltage to control the control element means of said tube means to make the current flow therethrough have an undulatory frequency in synchronism with the natural period of vibration of said motor, said electrical means being responsive to variations in the magnitude of said undulatory voltage to maintain the amplitude of vibration of the vibrated member of said motor substantially constant.

19. In vibratory electromagnetic apparatus, the combination with a vibratory electromagnetic motor having a natural period of vibration, of a power circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits including electronic tubes, connections whereby both channels derive voltage from said pickup, one channel comprising a frequency control channel and including means to produce an undulatory voltage corresponding in frequency to the natural period of vibration of said motor, the other an amplitude control channel and including means to produce a voltage determined by the amplitude of vibration of said motor, means for adjusting manually the voltage produced by said amplitude control channel to adjust the amplitude of vibration of said motor, means impressing the undulatory voltage produced by said frequency control channel on said electronic valve conductivity control means to control said valve whereby it delivers current in impulses to said motor at its natural period of vibration, and means responsive to the voltage produced by said amplitude control channel to maintain the amplitude of vibration of said motor substantially constant at any selected value.

20. In vibratory electromagnetic apparatus, the combination with a vibratory electromagnetic motor having a natural period of vibration, of a power circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits including electronic tubes, connections whereby both channels derive voltage from said pickup, one channel comprising a frequency control channel and including means to produce an undulatory voltage corresponding in frequency to the natural period of vibration of said motor, the other an amplitude control channel and including means to produce a voltage determined by the amplitude of vibration of said motor, means impressing the undulatory voltage produced by said frequency control channel on said electronic valve conductivity control means to control said valve whereby it delivers current in impulses to said motor at its natural period of vibration, and means responsive to the voltage produced by said amplitude control channel to maintain the amplitude of vibration of said motor substantially constant at any selected value.

21. In vibratory electromagnetic apparatus, the combination with a vibratory electromagnetic motor having a natural period of vibration, of a power circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits, connections whereby both channels derive voltage from said pickup, one channel comprising a frequency control channel and including means to produce an undulatory voltage corresponding in frequency to the natural period of vibration of said motor, the other an amplitude control channel and including means to produce a voltage determined by the value of the voltage generated by said pickup, means for adjusting manually the voltage produced by said amplitude control channel independently of the voltage of said frequency control channel to adjust the amplitude of vibration of said motor, means impressing the undulatory voltage produced by said frequency control channel on said electronic valve conductivity control means to control said valve whereby it delivers current in impulses to said motor at its natural period of vibration, and means responsive to the voltage produced by said amplitude control channel to maintain the amplitude of vibration of said motor substantially constant at any selected value.

22. In vibratory electromagnetic apparatus, the combination with a vibratory electromagnetic motor having a natural period of vibration, of a power circuit for said motor including electronic valve means having conductivity control means, an electrical pickup constructed and arranged to operate by vibration of said motor to generate a voltage having a frequency controlled by the frequency of vibration thereof and a voltage value determined by the amplitude of vibration thereof, a pair of electrical control channels comprising electrical circuits, connections whereby both channels derive voltage from said pickup, one channel comprising a frequency control channel and including means to produce an undulatory voltage corresponding in frequency to the natural period of vibration of said motor, the other an amplitude control channel and including means to produce a voltage determined by the value of the voltage generated by said pickup, means impressing the undulatory voltage produced by said frequency control channel on said electronic valve conductivity control means to control said valve whereby it delivers current in impulses to said motor at its natural period of vibration, and means responsive to the voltage produced by said amplitude control channel to maintain the amplitude of vibration of said motor substantially constant at any selected value.

23. In vibratory apparatus, the combination with a vibratory motor, of a power circuit therefor including gaseous tube means having control element means, means for controlling the frequency and amplitude of vibration of said motor comprising a pickup device connected to said motor to vibrate therewith and constructed and arranged to generate an undulating voltage having a frequency determined by the vibratory frequency of said motor and a voltage value determined by its amplitude of vibration, electrical circuits including means connected to said pickup device to produce two voltages one of which undulates at the frequency of vibration of said motor, the other of which has a value determined by said pickup generated voltage, means for manually adjusting the value of the other of said voltages independently of said one voltage, circuit means applying said one undulating voltage to the control element means of said tube means thereby to control the frequency of current delivered to said motor, and circuit means constructed and arranged to employ said other voltage to control the phase of the voltage on the control element means of said tube means thereby to maintain the amplitude of vibration of said motor substantially constant.

24. In vibratory apparatus, the combination with a vibratory motor, of a power circuit therefor including tube means having control element means, means for controlling the frequency and amplitude of vibration of said motor comprising a pickup device connected to said motor to vibrate therewith and constructed and arranged to generate an undulating voltage having a frequency determined by the vibratory frequency of said motor and a voltage value determined by its amplitude of vibration, electrical circuits including means connected to said pickup device to produce two voltages one of which undulates at the frequency of vibration of said motor, the other of which has a value determined by said pickup generated voltage, means for manually adjusting the value of the other of said voltages, circuit means applying said one undulating voltage to the control element means of said tube means thereby to control the frequency of current delivered to said motor, and circuit means constructed and arranged to employ said other voltage to control the phase of the voltage on the control element means of said tube means thereby to maintain the amplitude of vibration of said motor substantially constant.

25. In vibratory apparatus, the combination with a vibratory motor, of a power circuit therefor including tube means having control element means, means for controlling the frequency and amplitude of vibration of said motor comprising a pickup device connected to said motor to vibrate therewith and constructed and arranged to generate an undulating voltage having a frequency determined by the vibratory frequency of said motor and a voltage value determined by its amplitude of vibration, electrical circuits including means connected to said pickup device to produce two voltages one of which undulates at the frequency of vibration of said motor, the other of which has a value determined by said pickup generated voltage, circuit means applying said one undulating voltage to the control element means of said tube means thereby to control the frequency of current delivered to said motor, and circuit means constructed and arranged to employ said other voltage to control the phase of the voltage on the control element means of said tube means thereby to maintain the amplitude of vibration of said motor substantially constant.

26. In vibratory apparatus, the combination with a vibratory motor, of a power circuit therefor including tube means having control element means, means for controlling the frequency and amplitude of vibration of said motor comprising a pickup device connected to said motor to vibrate therewith and constructed and arranged to generate an undulating voltage having a frequency determined by the vibratory frequency of said motor and a voltage value determined by its amplitude of vibration, electrical circuits including means connected to said pickup device to produce two voltages one of which undulates at the frequency of vibration of said motor, the other of which has a value determined by said pickup generated voltage, circuit means applying said one undulating voltage to the control element means of said tube means thereby to control the frequency of current delivered to said motor and circuit means constructed and arranged to employ said other voltage to maintain the amplitude of vibration of said motor substantially constant.

27. In vibratory apparatus, the combination with a vibratory motor, of a power circuit therefor including tube means having control element means, means for controlling the frequency and amplitude of vibration of said motor comprising a pickup device connected to said motor to vibrate therewith and constructed and arranged to generate an undulating voltage having a frequency determined by the vibratory frequency of said motor and a voltage value determined by its amplitude of vibration, electrical circuits including means connected to said pickup device to produce two voltages one of which undulates at the frequency of vibration of said motor, the other of which has a value determined by said pickup generated voltage, means for manually adjusting the value of the other of said voltages, circuit means applying said one undulating voltage to the control element means of said tube means thereby to control the frequency of current delivered to said motor, and circuit means constructed and arranged to employ said other voltage to maintain the amplitude of vibration of said motor substantially constant.

28. In vibratory control apparatus, the combination with a vibratory electromagnetic motor, of means for controlling the amplitude of vibration thereof to maintain it substantially constant comprising a pickup vibrated by said motor and constructed and arranged to generate an alternating voltage proportional in value to the amplitude of vibration of said motor, means for amplifying and converting said voltage into a direct current voltage which is always proportional thereto, control means connected to utilize said direct current voltage, manually operable means for adjusting the value of said direct current voltage utilized by said control means to adjust the normal amplitude of vibration of said motor, and mechanism operated by said control means for adjusting the amplitude of vibration of said motor in response to changes in said direct current voltage from a normal value.

29. In vibratory control apparatus, the combination with a vibratory electromagnetic motor, of means for controlling the amplitude of vibration thereof to maintain it substantially constant comprising a pickup vibrated by said motor and constructed and arranged to generate an alternating voltage proportional in value to the amplitude of vibration of said motor, means for converting said voltage into a proportional direct current voltage, control means connected to utilize said direct current voltage, manually operable means for adjusting the value of said direct current voltage utilized by said control means to adjust the normal amplitude of vibration of said motor, and mechanism operated by said control means for adjusting the amplitude of vibration of said motor in response to changes in said direct current voltage from a normal value.

30. In vibratory control apparatus, the combination with a vibratory electromagnetic motor, of means for controlling the amplitude of vibration thereof to maintain it substantially constant comprising a pickup vibrated by said motor and constructed and arranged to generate an alternating voltage proportional in value to the amplitude of vibration of said motor, means for amplifying and converting said voltage into a proportional direct current voltage, control means connected to utilize said direct current voltage, and mechanism operated by said control means for adjusting the amplitude of vibration of said motor in response to changes in said direct current voltage from a normal value.

31. In vibratory control apparatus, the combination with a vibratory electromagnetic motor, of means for controlling the amplitude of vibration thereof to maintain it substantially constant comprising a pickup vibrated by said motor and constructed and arranged to generate an alternating voltage proportional in value to the amplitude of vibration of said motor, means for converting said voltage into a proportional direct current voltage, control means connected to utilize said direct current voltage, and mechanism operated by said control means for adjusting the amplitude of vibration of said motor in response to changes in said direct current voltage from a normal value.

32. In vibratory apparatus, the combination with a vibratory electromagnetic motor, of a power circuit therefor including electronic tube means having control element means, means for controlling the frequency of vibration of said motor comprising a pickup device connected to said motor to vibrate therewith and constructed and arranged to generate an alternating voltage having a frequency determined by the vibratory frequency of said motor, electrical circuits including means connected to said pickup device to produce an undulating direct current voltage which has an undulating frequency determined by the frequency of said alternating voltage, means comprising a condenser for maintaining said direct current voltage, and circuit means applying said undulating direct current voltage to said control element means.

33. In vibratory apparatus, the combination with a vibratory electromagnetic motor, of a power circuit therefor including electronic tube means having control element means, means for controlling the frequency of vibration of said motor comprising a pickup device connected to said motor to vibrate therewith and constructed and arranged to generate an alternating voltage having a frequency determined by the vibratory frequency of said motor, electrical circuits including means connected to said pickup device to produce an undulating direct current voltage which has an undulating frequency determined by the frequency of said alternating voltage, and circuit means applying said undulating direct current voltage to said control element means.

34. In vibratory apparatus, the combination with a vibratory electromagnetic motor, of a power circuit therefor including electronic tube means having control element means, means for controlling the frequency of vibration of said motor comprising a pickup device connected to said motor to vibrate therewith and constructed and arranged to generate an alternating voltage having a frequency determined by the vibratory frequency of said motor, electrical circuits including means connected to said pickup device to produce an undulating direct current voltage which has an undulating frequency determined by the frequency of said alternating voltage, means for sustaining said direct current voltage, and circuit means applying said undulating direct current voltage to said control element means.

CLYDE W. BAIRD.